(12) United States Patent
Shim et al.

(10) Patent No.: US 11,812,769 B2
(45) Date of Patent: Nov. 14, 2023

(54) AMINO ACID BEVERAGE CONTAINING ALLULOSE

(71) Applicant: CJ CHEILJEDANG CORPORATION, Seoul (KR)

(72) Inventors: Dong Seok Shim, Yongin-si (KR); Su-Jeong Kim, Suwon-si (KR); Seung Won Park, Yongin-si (KR); Youn-Kyung Bak, Suwon-si (KR); Jung Gyu Park, Incheon (KR); Sung Bae Byun, Sejong (KR); In Lee, Suwon-si (KR); Dong Chul Jung, Seoul (KR); Jong Min Choi, Suwon-si (KR)

(73) Assignee: CJ CHEILJEDANG CORPORATION, South (KR)

( * ) Notice: Subject to any disclaimer, the term of this patent is extended or adjusted under 35 U.S.C. 154(b) by 0 days.

(21) Appl. No.: 16/467,090

(22) PCT Filed: Dec. 20, 2017

(86) PCT No.: PCT/KR2017/015146
§ 371 (c)(1),
(2) Date: Jun. 6, 2019

(87) PCT Pub. No.: WO2018/117653
PCT Pub. Date: Jun. 28, 2018

(65) Prior Publication Data
US 2019/0313668 A1 Oct. 17, 2019

(30) Foreign Application Priority Data
Dec. 21, 2016 (KR) .................. 10-2016-0175262

(51) Int. Cl.
*A23L 2/38* (2021.01)
*A23L 33/175* (2016.01)
*A23L 27/30* (2016.01)
*A23L 2/60* (2006.01)

(52) U.S. Cl.
CPC .................. *A23L 2/38* (2013.01); *A23L 2/60* (2013.01); *A23L 27/30* (2016.08); *A23L 33/175* (2016.08); *A23V 2002/00* (2013.01); *A23V 2200/16* (2013.01); *A23V 2250/0606* (2013.01); *A23V 2250/0614* (2013.01); *A23V 2250/0632* (2013.01); *A23V 2250/0636* (2013.01)

(58) Field of Classification Search
CPC ..... A23L 2/00; A23L 2/38; A23L 2/56; A23L 2/60; A23L 33/00; A23L 33/17; A23L 33/175; A23L 27/30; A23L 27/31; A23L 27/33; A23V 2002/00; A23V 2200/00; A23V 2200/15; A23V 2200/16; A23V 2250/00; A23V 2250/06; A23V 2250/0606; A23V 2250/0632; A23V 2250/0636; A23V 2250/0614; A23V 2250/24; A23V 2250/60; A23V 2250/606
See application file for complete search history.

(56) References Cited

U.S. PATENT DOCUMENTS

| | | | |
|---|---|---|---|
| 9,049,876 B2 | 6/2015 | Fujihara et al. | |
| 9,717,267 B2 | 8/2017 | Parkash et al. | |
| 10,729,632 B2 | 8/2020 | Fletcher | |
| 2006/0035007 A1 | 2/2006 | Kawabe et al. | |
| 2007/0128311 A1 | 6/2007 | Prakash | |
| 2010/0015288 A1 | 1/2010 | Fukuda et al. | |
| 2010/0204346 A1 | 8/2010 | Okuma | |
| 2012/0076908 A1* | 3/2012 | Fujihara ............ | A23L 27/30 426/548 |
| 2012/0329735 A1* | 12/2012 | Sato ................. | A23L 5/00 514/23 |
| 2013/0274350 A1 | 10/2013 | Okuma | |
| 2014/0271746 A1 | 9/2014 | Woodyer | |
| 2014/0271747 A1 | 9/2014 | Woodyer | |
| 2014/0271996 A1 | 9/2014 | Prakash et al. | |
| 2014/0272068 A1 | 9/2014 | Prakash | |
| 2014/0322389 A1 | 10/2014 | Prakash et al. | |
| 2014/0342044 A1 | 11/2014 | Bell | |
| 2015/0230509 A1 | 8/2015 | Fujihara et al. | |
| 2016/0021917 A1 | 1/2016 | Woodyer | |
| 2016/0050958 A1 | 2/2016 | Woodyer | |
| 2016/0198751 A1 | 7/2016 | Fletcher | |
| 2016/0302463 A1 | 10/2016 | Woodyer et al. | |
| 2016/0331014 A1 | 11/2016 | Perera | |

(Continued)

FOREIGN PATENT DOCUMENTS

| | | |
|---|---|---|
| CL | 2016000258 A1 | 9/2016 |
| CL | 2016002955 A1 | 5/2017 |

(Continued)

OTHER PUBLICATIONS

International Search Report and Written Opinion for corresponding Patent Application No. PCT/KR2017/015146 dated Mar. 30, 2018.
Original and English Translation of Chinese Office Action issued for corresponding Chinese Application No. 201780071977.4, dated Jan. 24, 2022.
E. Guichard et al., Flavour—From Food to Perception, Wiley Blackwell, 2017, pp. 171-172.

(Continued)

*Primary Examiner* — Erik Kashnikow
*Assistant Examiner* — Lela S. Davis
(74) *Attorney, Agent, or Firm* — Renner, Otto, Boisselle & Sklar

(57) ABSTRACT

The present application relates to a beverage comprising water, an amino acid, and allulose. In addition, the present application relates to a method for reducing off-taste, off-odor, or acrid taste comprising a step of mixing water, an amino acid, and allulose.

7 Claims, No Drawings

(56) References Cited

U.S. PATENT DOCUMENTS

| | | |
|---|---|---|
| 2017/0027206 A1 | 2/2017 | Woodyer |
| 2017/0079313 A1 | 3/2017 | Woodyer |
| 2017/0245537 A1 | 8/2017 | Lee |
| 2017/0275666 A1 | 9/2017 | Prakash |
| 2018/0049458 A1 | 2/2018 | Woodyer |
| 2018/0243325 A1 | 8/2018 | Choi |
| 2018/0289042 A1 | 10/2018 | Bell |
| 2019/0218488 A1 | 7/2019 | Choi |
| 2019/0239539 A1 | 8/2019 | Shim |
| 2019/0246673 A1 | 8/2019 | Park |

FOREIGN PATENT DOCUMENTS

| | | | |
|---|---|---|---|
| CL | 2017002161 A1 | | 4/2018 |
| CL | 2018000523 A1 | | 2/2019 |
| CL | 2019000851 A1 | | 6/2019 |
| CL | 2019000872 A1 | | 6/2019 |
| CL | 2019000875 A1 | | 6/2019 |
| CN | 102429201 A | | 5/2012 |
| CN | 105188421 A | | 12/2015 |
| CN | 105307506 A | | 2/2016 |
| CN | 105338827 A | | 2/2016 |
| CN | 105338833 A | | 2/2016 |
| CN | 105828639 A | | 8/2016 |
| EP | 2156751 A1 | | 2/2010 |
| EP | 3 091 858 A1 | | 11/2016 |
| JP | 2003-235512 A | | 8/2003 |
| JP | 2003235512 | * | 8/2003 |
| JP | 2003-0274896 A | | 9/2003 |
| JP | 2007-043941 A | | 2/2007 |
| JP | 2007-116939 A | | 5/2007 |
| JP | 2008-048685 A | | 3/2008 |
| JP | 2014176323 A | | 9/2014 |
| JP | 2015-023803 A | | 2/2015 |
| KR | 2012-0033282 A | | 4/2012 |
| KR | 10-1435235 B | | 8/2014 |
| KR | 2015-0127155 A | | 11/2015 |
| KR | 2016-0075467 A | | 6/2016 |
| KR | 2016-0089551 A | | 7/2016 |
| KR | 2016-0098249 A | | 8/2016 |
| WO | 2004/052125 A1 | | 6/2004 |
| WO | 2014-152791 A1 | | 9/2014 |
| WO | 2015-075473 A1 | | 5/2015 |
| WO | 2016028899 A1 | | 2/2016 |
| WO | 2016040577 A1 | | 3/2016 |

OTHER PUBLICATIONS

K. Toko, Biomimetic Sensor Technology, Cambridge University Press, 2004, pp. 125-127.

R.S. Shallenberger, Taste Chemistry, Springer Science+Business Media, 1993, pp. 226-227.

* cited by examiner

AMINO ACID BEVERAGE CONTAINING ALLULOSE

CROSS-REFERENCE TO RELATED APPLICATIONS

This application claims the benefit of Korean Patent Application No. 10-2016-0175262, filed on Dec. 21, 2016, in the Korean Intellectual Property Office, the disclosure of which is incorporated herein in its entirety by reference.

TECHNICAL FIELD

The present application relates to an amino acid beverage containing allulose.

BACKGROUND ART

Amino acids are a major constituent of human body proteins and are involved in various enzymatic reactions and biological reactions in the body. There are typically 20 amino acids in nature, and among them, 8 amino acids [isoleucine, leucine, lysine, tryptophan, valine, methionine, phenylalanine, and threonine] are referred to as essential amino acids, because they are not synthesized in our body. Since these essential amino acids must be obtained in vitro, they must be consumed through various amino acid sources such as amino acid supplements and amino acid drinks, and the market is expanding year by year.

However, amino acids are substances that can exhibit various negative organoleptic characteristics. Especially, when applied in beverages, they may be dissolved therein and develop an off-taste, an off-odor, and the like, more strongly.

In order to solve such problems, there have been reported a method for masking an off-taste and an off-odor of amino acids with citrus oils (JP 2007-116939 A), a method for reducing a bitter taste of amino acids with ornithine (WO 2004-052125 A1), or the like. However, the effect of improving organoleptic properties of an amino acid beverage using allulose has not been reported.

Under these circumstances, the present inventors have conducted extensive studies and made extensive efforts to reduce the negative organoleptic characteristics of a beverage containing amino acids and have found that when allulose is used, the off-taste, the off-odor, and an acrid taste of the amino acid beverage are reduced and the overall preference for the amino acid beverage is remarkably increased, thereby completing the present application.

DISCLOSURE OF THE INVENTION

Technical Problem

An aspect of the present application provides a beverage comprising water, an amino acid, and allulose.

Another aspect of the present application provides a method for reducing an off-taste, an off-odor, or an acrid taste of a beverage containing an amino acid, comprising a step of mixing water, the amino acid, and allulose.

Technical Solution

Hereinafter, the present application will be described in more detail.

Meanwhile, the respective explanations and embodiments disclosed in the present application can also be applied to other explanations and embodiments. That is, all combinations of various elements disclosed in this application fall within the scope of the present application. In addition, it could not be said that the scope of the present application is limited by the specific description to be described below.

In addition those skilled in the art will recognize and confirm many equivalents to specific aspects of the present application described in this application by using only routine experimentation. Such equivalents are also intended to be included in the present application.

According to an aspect of the present application, there is provided a beverage including water, an amino acid, and allulose.

The water of the present application is not limited as long as it is water suitable for the preparation of common beverages, and may be, but not limited to, purified water, clean water, ground water, ion-containing drinking water, or a natural beverage, for example. The purified water includes all purified water such as purified water purified by ionization or filtration of general tap water or ground water, and the natural beverage is meant to include natural mineral water and artificial mineral water.

The amino acid of the present application may include both non-essential amino acids which are present in nature and can be synthesized in the human body, and essential amino acids which cannot be synthesized in the human body. Specifically, the amino acid of the present application may be one or more amino acids selected from the group consisting of L-arginine, L-methionine, L-ornithine, and L-citrulline.

In the present application, allulose is a type of saccharides having the formula $C_6H_2O_6$, the molecular weight of 180.16, is known to exist in small amounts in figs, grapes, and the like, and is also called psicose. The allulose is a concept including both D-allulose and L-allulose, and may be, but not limited to, one commercially available, one extracted directly from natural products, one chemically synthesized, or one prepared by biological methods. In addition, the allulose may be provided in solid or powder form, or as a liquid (i.e., syrup) containing the allulose. Specifically, the allulose of the present application may be a liquid allulose. The liquid allulose may contain the allulose in an amount of 10 to 99 parts by weight based on 100 parts by weight of dry solids (ds or DS).

In the beverage of the present application, the allulose may be contained in an amount of 3 to 11 parts by weight based on 100 parts by weight of the beverage, based on dry solids. Specifically, the allulose may be contained in an amount of 3 to 10 parts by weight, 3 to 9 parts by weight, 3 to 5 parts by weight, 4 to 11 parts by weight, 4 to 10 parts by weight, 4 to 9 parts by weight, 4 to 5 parts by weight, 5 to 11 parts by weight, 5 to 10 parts by weight, or 5 to 9 parts by weight, based on 100 parts by weight of the beverage, based on dry solids.

In the beverage of the present application, the amino acid and the allulose may be contained at a ratio of 1:30 to 1:110, based on dry solids weight. Specifically, the ratio may be 1:30 to 1:100, 1:30 to 1:90, 1:30 to 1:50, 1:40 to 1:110, 1:40 to 1:100, 1:40 to 1:90, 1:40 to 1:50, 1:50 to 1:110, 1:50 to 1:100, or 1:50 to 1:90.

As an embodiment, the beverage of the present application may further comprise one or more selected from the group consisting of sodium chloride, an organic acid, a high intensity sweetener, a flavoring, and a plant concentrate.

The sodium chloride may be natural or synthetic, provided that it can be used in beverages. Specifically, it may be a natural salt or a refined salt. Specifically, the sodium chloride may be contained in an amount of 0.01 weight % to 0.5 weight % or 0.05 weight % to 0.3 weight % based on the beverage weight.

The organic acid may be, for example, at least one organic acid selected from the group consisting of citric acid, lactic acid, acetic acid, fumaric acid, ascorbic acid and tartaric acid, or a salt thereof. Specifically, the organic acid may be contained in an amount of 0.01 weight % to 0.5 weight % or 0.1 weight % to 0.3 weight % based on the beverage weight.

The sodium chloride or organic acid may be in a solid, powder, or solution form.

The high intensity sweetener means a sweetener having the sweetness ten times or more higher than that of sucrose, and may be aspartame, acesulfame K, sucralose, rebaudioside-A, and the like. Specifically, the high intensity sweetener may be contained in an amount of 0.001 weight % to 0.025 weight % or 0.001 weight % to 0.01 weight % based on the beverage weight.

The flavoring may be, for example, a natural flavoring or a synthetic flavoring. Examples of the natural flavoring includes substances containing flavorings prepared from plant materials (that is, fruits, vegetables, medicinal plants, and the like) by conventional methods. Such natural flavorings may include components separated by steam distillation method, compression method, juice extraction method, extraction method, and the like, of natural materials. The flavoring may include one or more selected from flavors of materials, such as coffee flavor, black tea flavor, green tea flavor, oolong tea flavor, cocoa flavor, herb flavor, fruit flavor, lime flavor, grape flavor, apple flavor, lemon flavor, strawberry flavor, raspberry flavor, corn flavor, orange flavor, kumquat flavor, tangerine flavor, cinnamon flavor, grapefruit flavor, peach flavor, apricot flavor, pear flavor, apple flavor, pineapple flavor, cranberry flavor, blackberry flavor, schizandra flavor, box thorn flavor, blueberry flavor, black currant flavor, pomegranate flavor, acai berry flavor, banana flavor, mango flavor, guava flavor, watermelon flavor, dragon fruit flavor, durian flavor, melon flavor, Japanese apricot flavor, kiwi flavor, plum flavor, prune flavor, aronia flavor, papaya flavor, radish flavor, green pepper flavor, sweet pepper flavor, watercress flavor, parsley flavor, cauliflower flavor, cabbage flavor, Brussels sprout flavor, cabbage flavor, kale flavor, *Angelica utilis* flavor, spinach flavor, red beet flavor, broccoli flavor, pumpkin flavor, celery flavor, cabbage flavor, lettuce flavor, tomato flavor, carrot flavor, Welsh onion flavor, onion flavor, chives flavor, red pepper flavor, aloe flavor, cactus flavor, fatsia shoot flavor, elk clover flavor, dandelion flavor, Chinese yam flavor, ginger flavor, cornus fruit flavor, *Caragana sinica* flavor, Japanese lady bell flavor, mushroom flavor, balloon flower root flavor, codonopsis lanceolata flavor, *Hovenia dulcis* flavor, arrowroot flavor, red ginseng flavor, ginseng flavor, cloudy flavor, and the like. Specifically, the flavoring may be contained in an amount of 0.01 weight % to 0.5 weight % or 0.1 weight % to 0.3 weight % based on the beverage weight.

The plant concentrate means a resulting product concentrated from fruits, vegetables, medicinal plants, or the rest plant materials by conventional methods. Specifically, the plant may be the material used for the flavoring. More specifically, the plant concentrate may be contained in an amount of 0.01 weight % to 0.5 weight % or 0.1 weight % to 0.3 weight % based on the beverage weight.

The beverage of the present application may further include fructose in an amount of 0.6 parts by weight or less based on 100 parts by weight of the beverage, based on dry solids. Specifically, the beverage of the present application may include fructose in an amount of 0.15 to 0.6 parts by weight, 0.2 to 0.6 parts by weight, 0.4 to 0.6 parts by weight, 0.15 to 0.4 parts by weight, or 0.2 to 0.4 parts by weight, based on 100 parts by weight of the beverage, based on dry solids.

In another embodiment, the beverage of the present application may not include glucose, sucrose, or the combination thereof.

In another embodiment, the pH of the beverage of the present application may be in a range of 3.0 to 5.0. Specifically, the pH may be in a range of 3.3 to 4.8, 3.5 to 4.7, or 3.6 to 4.6.

In other embodiments, the acidity of the beverage of the present application may be in a range of 0.05 to 0.2. Specifically, the acidity may be in a range of 0.1 to 0.15, or 0.110 to 0.146. In addition, the acidity may be a titratable acidity calculated by [Equation 1] below.

$$\text{Acidity} = 0.6404 * \text{NaOH titer } (V)/\text{sample weight } (s) \quad [\text{Equation 1}]$$

(wherein *0.6404 is the amount (g) of citric acid corresponding to 1 mL of 0.1 N—NaOH)

In addition, the beverage of the present application may further include food ingredients other than the ingredients described above (for example, flavorings, colorants, pectic acid and salts thereof, alginic acid and salts thereof, pH adjusters, glycerin, carbonating agents, preservatives, stabilizers, antioxidants, vitamins, minerals, proteins, and electrolytes, and the like).

Another aspect of the present application provides a method for reducing an off-taste, an off-odor, or an acrid taste of a beverage containing an amino acid, comprising a step of mixing water, the amino acid, and allulose.

The term "acrid taste (acridity)" as used in the present application refers to a pungent taste that irritates a throat.

In an embodiment of the reduction method of the present application, the allulose may be mixed in an amount of 3 to 11 parts by weight based on 100 parts by weight of the beverage, based on dry solids. Specifically, the allulose may be mixed in an amount of 3 to 10 parts by weight, 3 to 9 parts by weight, 3 to 5 parts by weight, 4 to 11 parts by weight, 4 to 10 parts by weight, 4 to 9 parts by weight, 4 to 5 parts by weight, 5 to 11 parts by weight, 5 to 10 parts by weight, or 5 to 9 parts by weight, based on 100 parts by weight of the beverage, based on dry solids.

In an embodiment of the reduction method of the present application, the amino acid and the allulose may be mixed at a ratio of 1:30 to 1:110, based on dry solids weight. Specifically, the ratio may be 1:30 to 1:100, 1:30 to 1:90, 1:30 to 1:50, 1:40 to 1:110, 1:40 to 1:100, 1:40 to 1:90, 1:40 to 1:50, 1:50 to 1:110, 1:50 to 1:100, or 1:50 to 1:90.

In addition, in an embodiment of the reduction method of the present application, one or more selected from the group consisting of sodium chloride, a high intensity sweetener, an organic acid, a plant concentrate, and a flavoring, may be further mixed in the step of mixing.

In another embodiment, the reduction method of the present application may not include a step of mixing one or more saccharides selected from the group consisting of glucose, sucrose, or the combination thereof.

In another embodiment, the reduction method of the present application may further include a step of heating between 85° C. and 105° C., after the step of mixing. Specifically, the heating may be carried out between 90° C. and 105° C., between 95° C. and 105° C., or between 90° C. and 100° C.

In addition, in another embodiment, the reduction of the present application may further include a step of cooling, after the step of heating. Specifically, the cooling may be carried out at 25° C. or less, between 1 and 25° C., between 1° C. and 10° C., or between 5° C. and 10° C.

In the method for reducing the off-taste, the off-odor, or the acrid taste of the present application, the contents overlapping with those described in the beverage of the present application (for example, water, amino acids, allulose, and the like) are the same as those described in the beverage, and thus, the description thereof is omitted in order to avoid the excessive complexity of this specification.

Advantageous Effects

The amino acid beverage of the present application includes allulose, thereby reducing the off-taste, the off-odor, and the acrid taste resulting from the amino acid, and remarkably enhancing preferences of consumers. In addition, since the contained allulose has almost no calories, the amino acid beverage of the present application meets the essential health directionality of amino acid beverages.

MODE FOR CARRYING OUT THE INVENTION

Hereinafter, the present application will be described in more detail through Examples. However, these Examples are for illustrative purposes only, and the scope of the present application is not limited thereto. This will be apparently understood by those skilled in the art to which this application belongs.

Throughout the specification of the present application, "%" used to denote the concentration of a specific substance refers to solid/solid (weight/weight) %, solid/liquid (weight/volume) %, and liquid/liquid (volume/volume) %, unless otherwise stated.

Example 1: Preparation of Amino Acid Beverages

Amino acid beverages were prepared according to the following procedure by mixing raw materials in the ratios shown in Tables 1 to 3.

First, saccharides, L-amino acids (CJ CheilJedang), the grapefruit concentrate (65 Brix, JC World), Rebaudioside-A (Ra90, Macrocare), citric acid, trisodium citrate, refined salt, the stabilizer (T Texture 001, Cargill Sunkyung) and Cloudy (Bolak) were weighed and placed into a beaker, followed by mixing with purified water to a total amount ratio of 100 weight %. In Comparative examples 1 to 4, sucrose (white sugar, CJ CheilJedang) was used as the saccharides, and in Experimental examples 1 to 20, allulose (liquid allulose, 71 Brix, 95% or more of allulose based on dry solids) was used as the saccharides and the contents thereof were 3, 5, 10, 15, and 18 weight % [based on dry solids, 2.02, 3.37, 6.75, 10.12, and 12.14 weight %]. As L-amino acids, Experimental examples 1, 5, 9, 13 and 17 used L-arginine; Experimental examples 2, 6, 10, 14, and 18 used L-methionine; Experimental examples 3, 7, 11, 15, and 19 used L-ornithine; and Experimental examples 4, 8, 12, 16, and 20 used L-citrulline. Thereafter, the mixture was homogenized by mixing on a magnetic stirrer for 20 minutes, and the grapefruit flavor (Samjung Flavor) was put in accordance with a mixing ratio into the obtained homogenized mixture. A glass container was filled with the mixture, sealed with a cap, sterilized at 95° C. in a constant temperature water bath (Hanil Science, HA-35) for 10 minutes, subjected to a primary cooling at room temperature (25° C.) and a secondary cooling at 5° C. to 10° C., so that the amino acid beverage was prepared finally.

TABLE 1

| Classification (weight %) | Comparative example 1 | Comparative example 2 | Comparative example 3 | Comparative example 4 | Experimental example 1 | Experimental example 2 | Experimental example 3 | Experimental example 4 |
| --- | --- | --- | --- | --- | --- | --- | --- | --- |
| White sugar | 10 | 10 | 10 | 10 | — | — | — | — |
| Allulose | — | — | — | — | 3 | 3 | 3 | 3 |
| L-Arginine | 0.1 | — | — | — | 0.1 | — | — | — |
| L-Methionine | — | 0.1 | — | — | — | 0.1 | — | — |
| L-Ornithine | — | — | 0.1 | — | — | — | 0.1 | — |
| L-Citrulline | — | — | — | 0.1 | — | — | — | 0.1 |
| Grapefruit concentrate | 0.2 | 0.2 | 0.2 | 0.2 | 0.2 | 0.2 | 0.2 | 0.2 |
| Rebaudioside-A | 0.005 | 0.005 | 0.005 | 0.005 | 0.005 | 0.005 | 0.005 | 0.005 |
| Citric acid | 0.12 | 0.12 | 0.12 | 0.12 | 0.12 | 0.12 | 0.12 | 0.12 |
| Trisodium citrate | 0.05 | 0.05 | 0.05 | 0.05 | 0.05 | 0.05 | 0.05 | 0.05 |
| Refined salt | 0.1 | 0.1 | 0.1 | 0.1 | 0.1 | 0.1 | 0.1 | 0.1 |
| Stabilizer | 0.02 | 0.02 | 0.02 | 0.02 | 0.02 | 0.02 | 0.02 | 0.02 |
| Cloudy | 0.03 | 0.03 | 0.03 | 0.03 | 0.03 | 0.03 | 0.03 | 0.03 |
| Grapefruit flavor | 0.19 | 0.19 | 0.19 | 0.19 | 0.19 | 0.19 | 0.19 | 0.19 |
| Purified water | 89.185 | 89.185 | 89.185 | 89.185 | 96.185 | 96.185 | 96.185 | 96.185 |
| Total | 100 | 100 | 100 | 100 | 100 | 100 | 100 | 100 |

TABLE 2

| Classification (weight %) | Experimental example 5 | Experimental example 6 | Experimental example 7 | Experimental example 8 | Experimental example 9 | Experimental example 10 | Experimental example 11 | Experimental example 12 |
|---|---|---|---|---|---|---|---|---|
| White sugar | — | — | — | — | — | — | — | — |
| Allulose | 5 | 5 | 5 | 5 | 10 | 10 | 10 | 10 |
| L-Arginine | 0.1 | — | — | — | 0.1 | — | — | — |
| L-Methionine | — | 0.1 | — | — | — | 0.1 | — | — |
| L-Ornithine | — | — | 0.1 | — | — | — | 0.1 | — |
| L-Citrulline | — | — | — | 0.1 | — | — | — | 0.1 |
| Grapefruit concentrate | 0.2 | 0.2 | 0.2 | 0.2 | 0.2 | 0.2 | 0.2 | 0.2 |
| Rebaudioside-A | 0.005 | 0.005 | 0.005 | 0.005 | 0.005 | 0.005 | 0.005 | 0.005 |
| Citric acid | 0.12 | 0.12 | 0.12 | 0.12 | 0.12 | 0.12 | 0.12 | 0.12 |
| Trisodium citrate | 0.05 | 0.05 | 0.05 | 0.05 | 0.05 | 0.05 | 0.05 | 0.05 |
| Refined salt | 0.1 | 0.1 | 0.1 | 0.1 | 0.1 | 0.1 | 0.1 | 0.1 |
| Stabilizer | 0.02 | 0.02 | 0.02 | 0.02 | 0.02 | 0.02 | 0.02 | 0.02 |
| Cloudy | 0.03 | 0.03 | 0.03 | 0.03 | 0.03 | 0.03 | 0.03 | 0.03 |
| Grapefruit flavor | 0.19 | 0.19 | 0.19 | 0.19 | 0.19 | 0.19 | 0.19 | 0.19 |
| Purified water | 94.185 | 94.185 | 94.185 | 94.185 | 89.185 | 89.185 | 89.185 | 89.185 |
| Total | 100 | 100 | 100 | 100 | 100 | 100 | 100 | 100 |

TABLE 3

| Classification (weight %) | Experimental example 13 | Experimental example 14 | Experimental example 15 | Experimental example 16 | Experimental example 17 | Experimental example 18 | Experimental example 19 | Experimental example 20 |
|---|---|---|---|---|---|---|---|---|
| White sugar | — | — | — | — | — | — | — | — |
| Allulose | 15 | 15 | 15 | 15 | 18 | 18 | 18 | 18 |
| L-Arginine | 0.1 | — | — | — | 0.1 | — | — | — |
| L-Methionine | — | 0.1 | — | — | — | 0.1 | — | — |
| L-Ornithine | — | — | 0.1 | — | — | — | 0.1 | — |
| L-Citrulline | — | — | — | 0.1 | — | — | — | 0.1 |
| Grapefruit concentrate | 0.2 | 0.2 | 0.2 | 0.2 | 0.2 | 0.2 | 0.2 | 0.2 |
| Rebaudioside-A | 0.005 | 0.005 | 0.005 | 0.005 | 0.005 | 0.005 | 0.005 | 0.005 |
| Citric acid | 0.12 | 0.12 | 0.12 | 0.12 | 0.12 | 0.12 | 0.12 | 0.12 |
| Trisodium citrate | 0.05 | 0.05 | 0.05 | 0.05 | 0.05 | 0.05 | 0.05 | 0.05 |
| Refined salt | 0.1 | 0.1 | 0.1 | 0.1 | 0.1 | 0.1 | 0.1 | 0.1 |
| Stabilizer | 0.02 | 0.02 | 0.02 | 0.02 | 0.02 | 0.02 | 0.02 | 0.02 |
| Cloudy | 0.03 | 0.03 | 0.03 | 0.03 | 0.03 | 0.03 | 0.03 | 0.03 |
| Grapefruit flavor | 0.19 | 0.19 | 0.19 | 0.19 | 0.19 | 0.19 | 0.19 | 0.19 |
| Purified water | 84.185 | 84.185 | 84.185 | 84.185 | 81.185 | 81.185 | 81.185 | 81.185 |
| Total | 100 | 100 | 100 | 100 | 100 | 100 | 100 | 100 |

Example 2: Organoleptic Evaluation of Amino Acid Beverages

The beverages of Comparative examples and Experimental examples were prepared in respective tasting cups, and organoleptic evaluation was carried out by using a panel of 30 persons. Each tasting cup was given a random number to exclude the prejudices of the organoleptic panel, and the off-taste, off-odor, acidity, and overall preference were measured. Herein, the off-taste, off-odor, acidity, and overall preference were expressed as the values of 1 to 5, and the higher the organoleptic intensities of the off-taste, off-odor, and the acidity, the larger the expressed values thereof, and the better the overall preference, the larger the expressed value.

As a result, in Experimental examples 5 to 16, it was found that the intensities of off-taste, off-odor, and acidity were reduced, and the overall preference was significantly improved, compared to Comparative example (arginine organoleptic evaluation of Table 4, methionine organoleptic evaluation of Table 5, ornithine organoleptic evaluation of Table 6, and citrulline organoleptic evaluation of Table 7). Therefore, it was found clearly that allulose was added to beverages containing amino acids so as to relieve the off-taste, off-odor and acridity, and enhance the overall preference.

TABLE 4

| Classification | Off-taste, off-odor | Acridity | Overall preference | Note |
|---|---|---|---|---|
| Comparative example 1 | 4.5 | 4.2 | 2.3 | -(Arginine) |
| Experimental example 1 | 4.2(p > 0.05) | 3.8(p > 0.05) | 2.5(p > 0.05) | P: T-test paired comparison values |
| Experimental example 5 | 3.1(p < 0.05) | 3.1(p < 0.05) | 3.2(p < 0.05) | (p < 0.05, significant |
| Experimental example 9 | 3.2(p < 0.05) | 2.8(p < 0.05) | 3.3(p < 0.05) | difference occurrence) |
| Experimental example 13 | 3.2(p < 0.05) | 2.7(p < 0.05) | 3.8(p < 0.05) | |
| Experimental example 17 | 3.8(p > 0.05) | 3.8(p > 0.05) | 3.1(p > 0.05) | |

\* The t-test value is a statistical value between the value of each Experimental example and the value of Comparative example 1.

TABLE 5

| Classification | Off-taste, off-odor | Acridity | Overall preference | Note |
|---|---|---|---|---|
| Comparative example 2 | 4.7 | 4.5 | 1.8 | -(Methionine) |
| Experimental example 2 | 4.3(p > 0.05) | 4.0(p > 0.05) | 2.6(p > 0.05) | P: T-test paired comparison values |
| Experimental example 6 | 3.0(p < 0.05) | 3.2(p < 0.05) | 2.8(p < 0.05) | (p < 0.05, significant |
| Experimental example 10 | 3.3(p < 0.05) | 3.0(p < 0.05) | 3.1(p < 0.05) | difference occurrence) |
| Experimental example 14 | 3.4(p < 0.05) | 2.8(p < 0.05) | 3.9(p < 0.05) | |
| Experimental example 18 | 4.2(p > 0.05) | 4.0(p > 0.05) | 2.9(p > 0.05) | |

\* The t-test value is a statistical value between the value of each Experimental example and the value of Comparative example 2.

TABLE 6

| Classification | Off-taste, off-odor | Acridity | Overall preference | Note |
|---|---|---|---|---|
| Comparative example 3 | 4.5 | 4.3 | 2.5 | -(Ornithine) |
| Experimental example 3 | 4.1(p > 0.05) | 4.1(p > 0.05) | 2.1(p > 0.05) | P: T-test paired comparison values |
| Experimental example 7 | 2.9(p < 0.05) | 3.1(p < 0.05) | 2.9(p < 0.05) | (p < 0.05, significant |
| Experimental example 11 | 3.2(p < 0.05) | 2.9(p < 0.05) | 3.0(p < 0.05) | difference occurrence) |
| Experimental example 15 | 3.3(p < 0.05) | 2.5(p < 0.05) | 4.0(p < 0.05) | |
| Experimental example 19 | 4.3(p > 0.05) | 3.9(p > 0.05) | 3.0(p > 0.05) | |

\* The t-test value is a statistical value between the value of each Experimental example and the value of Comparative example 3.

TABLE 7

| Classification | Off-taste, off-odor | Acridity | Overall preference | Note |
|---|---|---|---|---|
| Comparative example 4 | 4.4 | 4.2 | 2.4 | -(Citrulline) |
| Experimental example 4 | 4.0(p > 0.05) | 4.2(p > 0.05) | 2.3(p > 0.05) | P: T-test paired comparison values |
| Experimental example 8 | 3.1(p < 0.05) | 3.3(p < 0.05) | 3.1(p < 0.05) | (p < 0.05, significant |
| Experimental example 12 | 3.0(p < 0.05) | 3.1(p < 0.05) | 3.5(p < 0.05) | difference occurrence) |
| Experimental example 16 | 3.3(p < 0.05) | 2.3(p < 0.05) | 4.5(p < 0.05) | |
| Experimental example 20 | 4.1(p > 0.05) | 3.8(p > 0.05) | 3.0(p > 0.05) | |

\* The t-test value is a statistical value between the value of each Experimental example and the value of Comparative example 4.

Example 3: Characterization of Amino Acid Beverages

In order to characterize amino acid beverages, the pHs and acidities of Experimental examples were measured. The pH was measured using a pH meter (Mettler Toledo, Seven compact). The acidity was obtained by titrating the sample (s) of each Experimental example weighted (Mettler Toledo, New Classic ML model) with 0.1 N NaOH standard solution (Daejung Chemicals & Metals Co., Ltd.), measuring a NaOH titer (V) at the time point when the pH reached 8.1, and substituting the weight value of the sample (s) and the NaOH titer value (V) into [Equation 1] below to yield the acidity.

$$\text{Acidity} = 0.6404 * V/s \quad \text{[Equation 1]}$$

(wherein \*0.6404 is the amount (g) of citric acid corresponding to 1 mL of 0.1 N—NaOH)

As a result, it could be found that the pHs of the amino acid beverages were between 3.5 and 4.3, and the acidities were between about 0.1 and 0.15.

TABLE 8

| Classification | Experimental example 5 | Experimental example 6 | Experimental example 7 | Experimental example 8 | Experimental example 13 | Experimental example 14 | Experimental example 15 | Experimental example 16 |
|---|---|---|---|---|---|---|---|---|
| pH | 4.38 | 3.6 | 3.71 | 3.61 | 4.6 | 3.71 | 3.57 | 3.59 |
| Acidity | 0.1237 | 0.1428 | 0.1442 | 0.1455 | 0.1140 | 0.1383 | 0.1407 | 0.1369 |

The invention claimed is:

1. A beverage comprising:
water, an amino acid, allulose, grapefruit concentrate, Rebaudioside A, and citric acid,
wherein 6.75 to 10.12 parts by weight of the allulose is contained based on 100 parts by weight of the beverage, based on dry solids,
the amino acid and allulose are contained at a ratio of 1:67.5 to 1:101.2, based on dry solids, and
the amino acid is L-arginine, L-methionine, L-ornithine, or L-citrulline,
wherein the amino acid is the only amino acid in the beverage.

2. The beverage of claim 1, wherein 0.6 or less parts by weight of fructose is additionally included based on 100 parts by weight of the beverage, based on dry solids.

3. The beverage of claim 1, wherein sucrose, glucose, or the combination of thereof, is not contained.

4. The beverage of claim 1, wherein the pH is in a range of 3.0 to 5.0.

5. The beverage of claim 1, wherein the titratable acidity is in a range of 0.05 to 0.2%.

6. A method for reducing an off-taste, an off-odor, and an acrid taste of a beverage containing an amino acid, comprising:
a step of mixing water, the amino acid, allulose, grapefruit concentrate, Rebaudioside A, and citric acid,
wherein 6.75 to 10.12 parts by weight of the allulose is mixed based on 100 parts by weight of the beverage containing an amino acid, based on dry solids, based on dry solids,
the amino acid and allulose are mixed at a ratio of 1:67.5 to 1:101.2, based on dry solids, and
the amino acid is L-arginine, L-methionine, L-ornithine or L-citrulline,
wherein the amino acid is the only amino acid in the beverage.

7. The method of claim 6, wherein a step of mixing one or more saccharides selected from the group consisting of glucose, sucrose, or the combination thereof is not included.

* * * * *